United States Patent
Winkler

[19]

[11] Patent Number: 6,073,885
[45] Date of Patent: Jun. 13, 2000

[54] FLIGHT STATION ACCESS SYSTEM FOR AN AIRCRAFT

[75] Inventor: Edward Richard Winkler, St. Peters, Mo.

[73] Assignee: McDonnell Douglas Corporation, St. Louis, Mo.

[21] Appl. No.: 09/072,065

[22] Filed: May 4, 1998

[51] Int. Cl.[7] ...................................................... B64D 9/00
[52] U.S. Cl. ................................... 244/137.2; 244/122 R; 244/118.5
[58] Field of Search ............................ 244/122 R, 137.2, 244/118.5, 118.6, 141, 140, 122 A, 129.4, 129.5

[56] References Cited

U.S. PATENT DOCUMENTS

| | | |
|---|---|---|
| 1,798,137 | 3/1931 | Beck . |
| 2,476,770 | 7/1949 | Robert . |
| 2,671,622 | 3/1954 | Saulnier . |
| 2,806,666 | 9/1957 | Brown et al. . |
| 2,806,667 | 9/1957 | Kugler ..................................... 244/141 |
| 2,829,850 | 4/1958 | Culver ..................................... 244/141 |
| 2,985,413 | 5/1961 | Von Beckh Widmanstetter . |
| 2,986,361 | 5/1961 | Codding . |
| 3,999,728 | 12/1976 | Zimmer . |
| 4,645,147 | 2/1987 | Hendricks ............................. 244/137.2 |
| 5,297,761 | 3/1994 | Kendall, Jr. . |

FOREIGN PATENT DOCUMENTS

| | | | |
|---|---|---|---|
| 2668116 | 4/1992 | France ................................... 244/900 |

*Primary Examiner*—Galen Barefoot
*Attorney, Agent, or Firm*—Alston & Bird LLP

[57] ABSTRACT

A crew systems module for providing normal ingress to and egress from an aircraft cockpit flight station includes a seat assembly for supporting a crew member and a shell which supports the seat assembly and is pivotally attached to the aircraft adjacent the cockpit. The shell is pivotal from a closed position placing the crew member in a flight-ready position to an ingress/egress position placing the crew member in a generally standing position. The shell in the ingress/egress position extends downward from the cockpit toward the ground. The shell preferably extends downward through the aircraft's wheel well which houses a folding or collapsible landing gear during flight. The crew systems module may be incorporated in a capsule which is separable from the aircraft in an emergency.

12 Claims, 2 Drawing Sheets

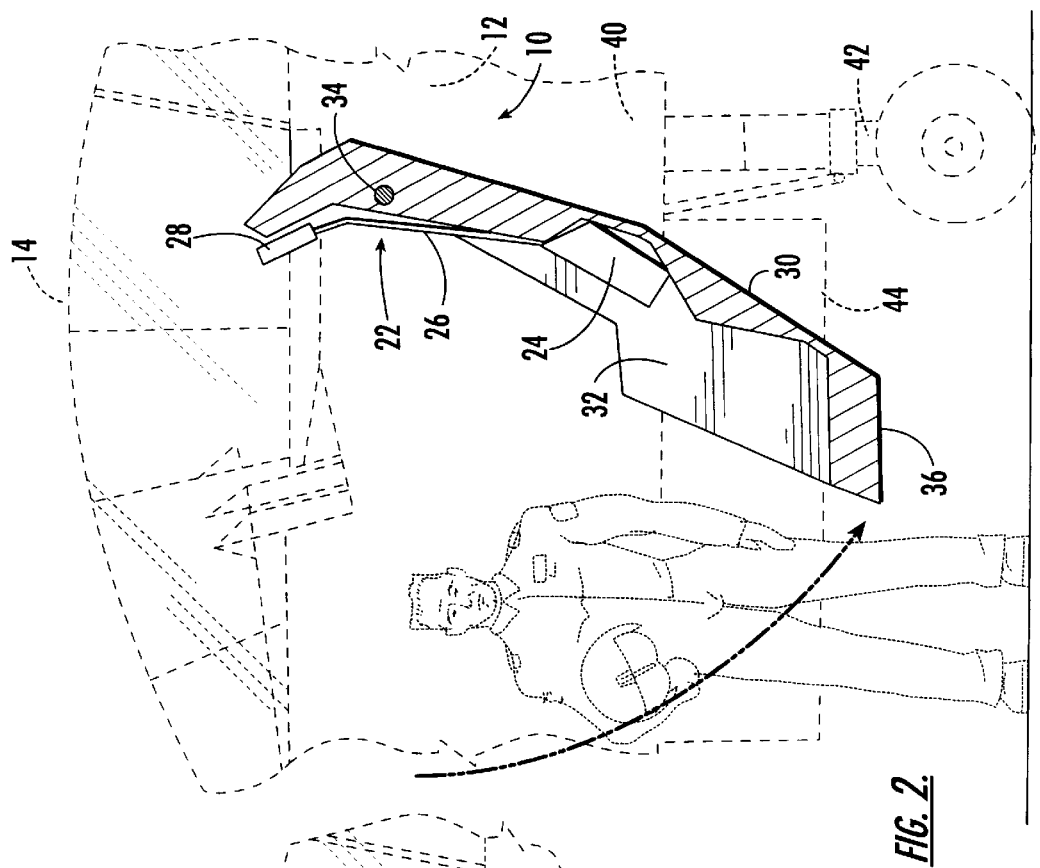
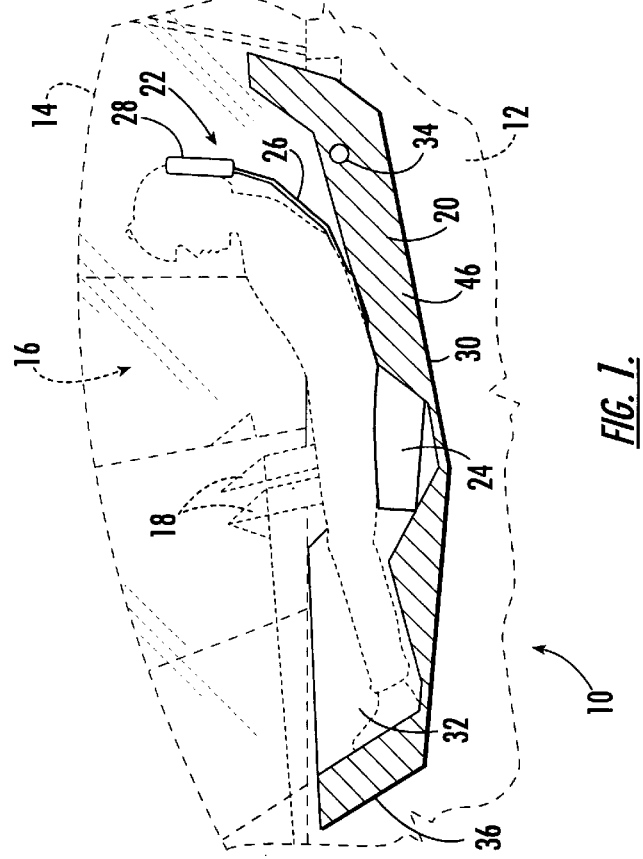
FIG. 2.
FIG. 1.

FLIGHT STATION ACCESS SYSTEM FOR AN AIRCRAFT

FIELD OF THE INVENTION

The present invention relates to systems for accessing the flight station of an aircraft and, more particularly, to a crew systems module providing normal ingress to and egress from an aircraft flight station from below the flight station.

BACKGROUND OF THE INVENTION

Military fighter and attack aircraft typically provide ingress to and egress from the cockpit via a movable canopy which encloses the upper portion of the cockpit. The canopy is either slidable or pivotable into an open position to establish an opening through which a crew member can enter into or exit from the cockpit. Furthermore, access to the cockpit by ground crew for maintenance and other support services is also through the open canopy.

Although the movable-canopy system for accessing a cockpit has been the standard system for many years, there are several distinct disadvantages of such systems. First, the aircraft cockpit on many fighter aircraft is at a substantial height above the ground. Accordingly, a crew member generally must climb a ladder to gain access to the cockpit and to reach the ground safely upon exiting the cockpit. When a ladder is not readily available, the crew member conceivably can jump to the ground when a hasty exit is required, but the crew member may easily be injured doing so. Thus, the accessibility to the cockpit provided by movable-canopy systems is inconvenient, and potentially dangerous.

A second disadvantage of movable-canopy access systems is that cockpit instrument displays must be designed to allow a crew member to get into a crew seat from above and, accordingly, constraints are put on the permissble locations and sizes of the displays.

Yet another disadvantage of movable-canopy systems is that when the aircraft is on the ground and the canopy is open, the crew member is exposed to chemical, biological, or radiation fallout.

SUMMARY OF THE INVENTION

The present invention overcomes the drawbacks associated with movable-canopy access systems noted above, by providing a crew systems module which gives the crew member access to the cockpit from safely below the aircraft rather than from above through an open canopy. More particularly, the invention provides a crew systems module for an aircraft cockpit which includes a crew module having a crew seat assembly and a shell supporting the crew seat assembly. The module is pivotally attached to the aircraft adjacent the cockpit so as to be pivotable between a flight position and an ingress/egress position, the crew module in the ingress/egress position extending generally downwardly from the aircraft cockpit. An actuator coupled between the crew module and the aircraft is operable to move the crew module from the ingress/egress position to the flight position and vice versa.

The shell includes a floor underlying the crew seat assembly and side walls extending generally upward from the floor on opposite longitudinal sides of the crew seat assembly so as to partially surround the crew seat assembly.

Preferably, the crew module is pivotally attached to the aircraft about a pivot axis located adjacent an aft end of the crew module, the crew module in the flight position placing a crew member in a generally reclined position with respect to the aircraft, and the crew module in the ingress/egress position placing a crew member in a generally standing position with respect to the aircraft. Thus, operation of the actuator rotates the crew module so as to lower the crew member's feet toward the ground, and once the crew module is fully open, the crew member may safely climb down to the ground from a relatively low height.

The invention also provides a crew system in which a crew module is ejectable from the aircraft in an emergency as a substantially closed capsule including the aircraft canopy. The crew system comprises an aircraft cockpit defining the crew flight station and including a canopy enclosing an upper portion of the flight station, the cockpit having a passage located below the flight station and adapted to be aligned with an opening in a bottom portion of the aircraft for providing ingress to and egress from the flight station downwardly through the passage and out the opening in the aircraft. A crew module adapted to support a crew member is pivotally attached to the aircraft cockpit so as to be pivotable between a closed position in which the crew module closes the passage and positions the crew member in a flight-ready position and an open position in which the crew module pivots downwardly and opens the passage to permit ingress to and egress from the flight station. An actuator coupled between the aircraft cockpit and the crew module moves the crew module between the open and closed positions.

The canopy is connected to the crew module for ejection therewith, the canopy and crew module forming a capsule substantially enclosing the crew member. The capsule may be flyable by the incorporation of a fixed or deployable lifting surface in the crew module.

The invention thus provides a crew systems module which allows a crew member to enter the flight station without the necessity of a ladder, and to disembark from the aircraft without substantial danger of injury in jumping to the ground. Access to the cockpit by ground support personnel is also improved. The crew systems module also allows the aircraft designer greater freedom in designing and locating instrument displays in the cockpit, since the crew member enters the cockpit from below the displays rather than above. The invention further provides potentially greater protection to the crew member against ballistic projectiles striking the crew member, by virtue of the shell which partially surrounds the crew member, and greater protection against chemical, biological, and/or radiation fallout while the aircraft is on the ground, since there is no open canopy above the crew member.

The crew systems module also facilitates placing the crew member in a reclining position with the heart close to the same vertical level as the eyes, which is advantageous for tolerating high gravitational forces produced during high-rate turning maneuvers. Moreover, in the capsule version of the crew systems module, the invention permits emergency ejection at higher dynamic pressures than are safely possible with typical open-seat ejection systems.

BRIEF DESCRIPTION OF THE DRAWINGS

The above and other objects, features, and advantages of the invention will become apparent from the following detailed description of various embodiments thereof, taken in conjunction with the accompanying drawings in which:

FIG. 1 is a fragmentary side elevational view of an aircraft depicting the cockpit having a crew system in accordance with the invention, showing the crew module in a closed or flight-ready position;

FIG. 2 is a view similar to FIG. 1, showing the crew module in an open or ingress/egress position;

DETAILED DESCRIPTION OF THE DRAWINGS

Figure 3:
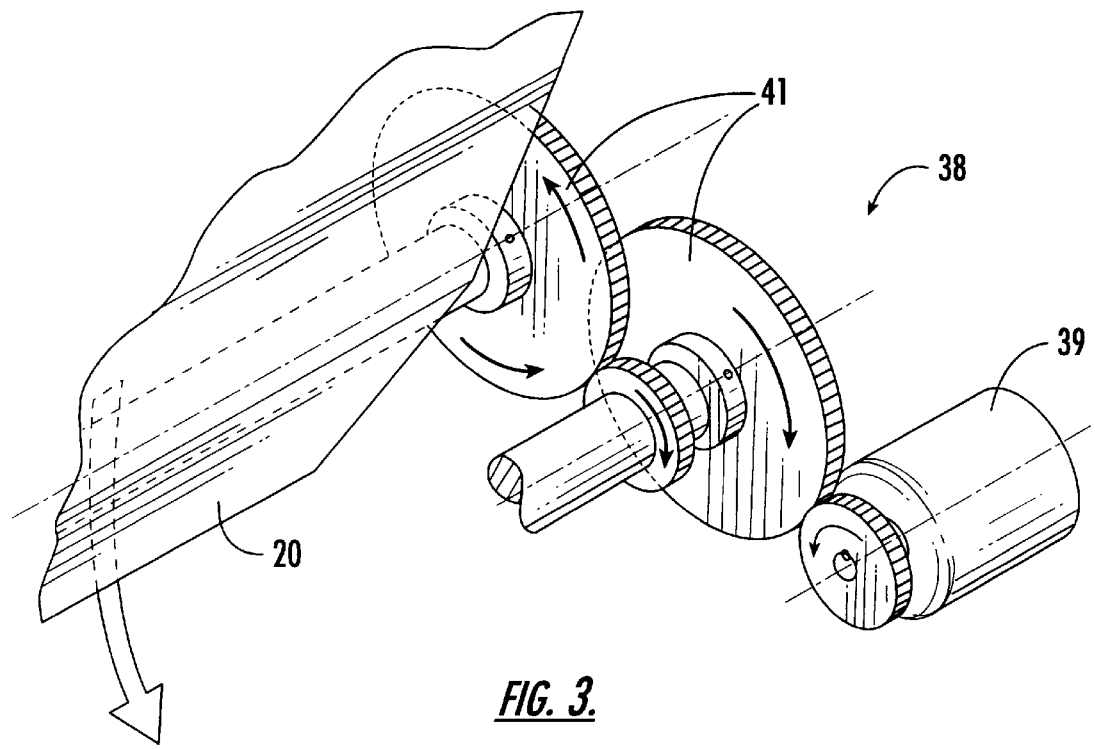
FIG. 3 is a perspective view of a motor and gear arrangement for pivoting the shell between the flight-ready and the ingress/egress positions.

The principles of the invention are explained below by reference to certain preferred embodiments thereof. However, these embodiments serve merely as illustrative examples and are not to be taken as limiting in any way.

With reference to FIG. 1, a crew systems module in accordance with the invention is indicated broadly by the reference numeral 10. An aircraft fuselage 12 and transparent canopy 14 are shown to define a cockpit and flight station 16 in which a crew member sits or reclines. The flight station 16 includes instrument displays 18 positioned for viewing by the crew member.

The crew systems module 10 permits the crew member to enter and exit the cockpit and flight station 16 from below, as opposed to having to climb up atop the aircraft and open a canopy to enter the cockpit from above. To this end, the crew systems module 10 includes a tub or shell 20 which supports a crew seat assembly 22. The seat assembly includes a seat bottom 24, a seat back 26, and a head rest 28.

The shell 20 includes a bottom wall 30 forming a floor of the shell, and opposite side walls 32 (only one visible in FIGS. 1 and 2) which upstand from opposite side edges of the bottom wall 30 and partially surround the crew seat assembly 22. A cross-hatched region of the shell 20 is shown in FIGS. 1 and 2 in order to indicate a space within the crew systems module 10 which is available for containing propulsion and recovery systems for use in ejecting the seat and crew member from the aircraft and carrying the crew member to safety.

The shell 20 is pivotally connected to the aircraft about a pivot point 34 located such that pivoting the shell 20 about the pivot point 34 causes the leading edge 36 of the shell 20 to be lowered toward the ground, as shown in FIG. 2. When the crew member is reclining in the flight-ready closed position of the crew systems module as shown in FIG. 1, pivoting the shell 20 about the pivot point 34 thus causes the crew member to be brought to a generally standing position. The crew member may then safely step down from the crew systems module to the ground without the assistance of a ladder and with substantially reduced danger of injury compared to exiting through an open canopy without a ladder. The invention thus provides improved crew emergency ground egress, by enabling the crew member to quickly and safely exit the aircraft without the need for any ground support equipment or personnel.

When the crew member wants to enter the cockpit, he steps up into the shell 20 and assumes a generally standing position against the seat assembly 22, and then the shell 20 is pivoted upward about the pivot point 34 until the shell 20 is brought to the position as shown in FIG. 1. The crew member is then in a flight-ready position. Advantageously, the seat assembly 22 provides for the seat back 26 to be pivotally adjusted relative to the seat bottom 24 to permit the back angle of the seat to be adjusted as desired by the crew member, which can be seen by comparing FIGS. 1 and 2.

With reference to FIG. 3, the crew systems module 10 includes one or more actuators 38 for pivotally moving the shell 20 between the closed and open positions. The actuator 38 may comprise a hydraulic cylinder, pneumatic cylinder, motor and gear arrangement, or other type of actuator. Preferably, the actuator 38 comprises an electric motor 39 and a series of reducing gears 41 having a final gear connected to the shell 20 for rotation therewith.

As shown in FIGS. 1–2, the crew systems module 10 advantageously is pivoted downward through a wheel well 40 of the aircraft. The wheel well 40 houses a foldable landing gear 42 when the aircraft is in flight. When the aircraft is to be landed, a pair of doors 44 are opened and the landing gear 42 is extended downward through the opening defined by the open doors and into a landing position. Once the aircraft is on the ground and stopped, the crew systems module 10 may be pivotally lowered through the wheel well 40. The shell 20 in the egress position extends through the opening created by the open doors 44. Thus, the crew member exits and enters the cockpit through the wheel well 40.

The shell 20 preferably seals against a mating structure of the aircraft cockpit when the crew systems module is in the closed flight-ready position shown in FIG. 1, so that the module seals the flight station enclosure. A balloon seal (not shown) may advantageously be employed for this purpose.

The crew systems module of the invention may be adapted either for open-seat or capsule ejection of a crew member. In open-seat ejection, the aircraft canopy 14 is separated from the aircraft to establish an opening above the crew member. Separation of the canopy typically also removes the instrument displays 18 and raises a blast shield (not shown) in front of the crew member to provide protection from wind blast. The seat assembly 22 and crew member are then forcefully ejected upward through the upper opening by rocket thrusters or other propulsion device indicated as the cross-hatched region 46 of FIGS. 1 and 2.

Figure 4:
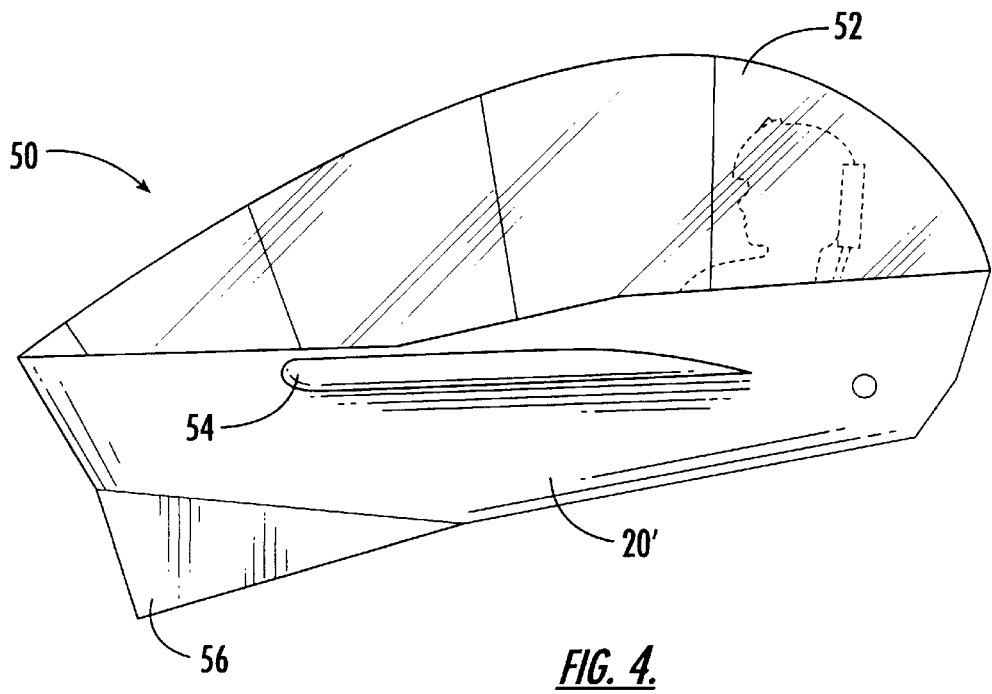
FIG. 4 is a perspective view of a capsule embodiment of the crew module in which the crew module and canopy are ejected from the aircraft as a closed capsule.

FIG. 4 shows another preferred embodiment of the invention in which the crew systems module comprises a substantially closed capsule 50 which can be separated from the aircraft during an emergency in order to carry the crew member to safety. The capsule 50 includes the shell 20' and a canopy 52. During normal operations of the aircraft, the capsule 50 aligns with the wheel well of the aircraft so that the shell 20' may be pivoted downward through the wheel well for ingress to and egress from the flight station, as previously described.

When an emergency requires the crew member to be ejected from the aircraft, the capsule 50 is separated from the aircraft, such as by rocket propulsion or other suitable device. The crew member is substantially enclosed by the capsule. The capsule 50 includes lifting surfaces 54 (only one shown in FIG. 4) and a rudder 56, which may be fixed structures or ones that are deployable upon separation of the capsule from the aircraft. The surfaces 54 and 56 provide sufficient lift and stability to permit the capsule 50 to glide, and may include movable control surfaces (not shown) to enable the crew member to control attitude and other flight characteristics of the capsule.

The invention thus provides a crew systems module permitting normal and safe ingress to and egress from a flight station of an aircraft without the assistance of any ladder or ground support devices or personnel. The crew systems module also improves emergency ground egress, since the crew member may safely exit the aircraft without having to wait for ground support equipment to be positioned. The improved accessibility to the cockpit is also an advantage for ground support personnel servicing the aircraft. The crew member is also partially surrounded by a shell which may provide additional protection against projectiles striking the crew member. The invention also provides potential for larger instrument displays to be used, since the crew member enters the cockpit from below the displays rather than from above.

The crew systems module also facilitates placing the crew member in a reclining position with the heart close to the same vertical level as the eyes, which is advantageous for tolerating high gravitational forces produced during high-rate turning maneuvers. Moreover, in the capsule version of the crew systems module, the invention permits emergency ejection at higher dynamic pressures than are safely possible with typical open-seat ejection systems.

The foregoing illustrated and described embodiments of the invention serve merely to explain the general principles of the invention. Modifications and substitutions of equivalents may be made to the exemplary embodiments without departing from the scope of the invention set forth in the appended claims.

What is claimed is:

1. A crew systems module providing ingress to and egress from a cockpit of an aircraft, and comprising:

a crew seat assembly for supporting a crew member;

a shell supporting the crew seat assembly, the shell being adapted to be pivotally attached to the aircraft cockpit so as to be pivotable between a flight position and an ingress/egress position, the shell in the ingress/egress position extending generally downwardly from the aircraft cockpit; and an actuator operably coupled to the shell and operable to move the shell from the ingress/egress position to the flight position and vice versa.

2. The crew systems module of claim 1 wherein the shell includes a floor underlying the crew seat assembly and side walls extending generally upward from the floor on opposite longitudinal sides of the crew seat assembly so as to partially surround the crew seat assembly.

3. The crew systems module of claim 1 wherein the shell is adapted to be pivotally attached to the aircraft cockpit about a pivot axis located adjacent an aft end of the shell, the shell in the flight position placing a crew member in a generally reclined position with respect to the aircraft, and the shell in the ingress/egress position placing a crew member in a generally standing position with respect to the aircraft.

4. The crew systems module of claim 1 wherein the actuator comprises an electrically operated motor.

5. A crew system providing normal crew access to a flight station of an aircraft from below the aircraft, and comprising:

an aircraft cockpit defining the crew flight station and including a canopy enclosing an upper portion of the flight station, the cockpit having a passage located below the flight station and adapted to be aligned with an opening in a bottom portion of the aircraft for providing ingress to and egress from the flight station downwardly through the passage and out the opening in the aircraft;

a crew module adapted to support at least one crew member, the crew module being pivotally attached to the aircraft cockpit so as to be pivotable between a closed position in which the crew module closes the passage and positions the crew member in a flight-ready position and an open position in which the crew module pivots downwardly and opens the passage to permit ingress to and egress from the flight station; and an actuator coupled between the aircraft cockpit and the crew module and operable to move the crew module between the open and closed positions.

6. The crew system of claim 5 wherein the crew module comprises a crew seat assembly and a shell which supports the crew seat assembly, the shell including a floor underlying the crew seat assembly and side walls extending generally upward from the floor on opposite longitudinal sides of the crew seat assembly so as to partially surround the crew seat assembly.

7. The crew system of claim 6 wherein the crew seat assembly includes a seat having a seat back for supporting the torso of a crew member, and wherein the seat is adjustable to selectively vary the angle of the seat back with respect to the shell of the crew module.

8. The crew system of claim 5 wherein the crew module is pivotally attached to the aircraft cockpit about a pivot axis located adjacent an aft end of the crew module, and wherein the crew module in the closed position places a crew member in a generally reclined position with respect to the aircraft, and the crew module in the open position places a crew member in a generally standing position with respect to the aircraft.

9. The crew system of claim 5 wherein the actuator comprises an electrically operated motor.

10. The crew system of claim 5 wherein the canopy is separable from the aircraft to establish an ejection opening above the crew module for ejection of the seat assembly therethrough.

11. The crew system of claim 5 wherein the canopy and crew module form a capsule substantially enclosing the crew member, the capsule being separable from the aircraft for ejecting the crew member during an emergency.

12. The crew system of claim 11, further comprising a lifting surface attached to the crew module for providing lift to the capsule after separation from the aircraft.

* * * * *